Figure 6:
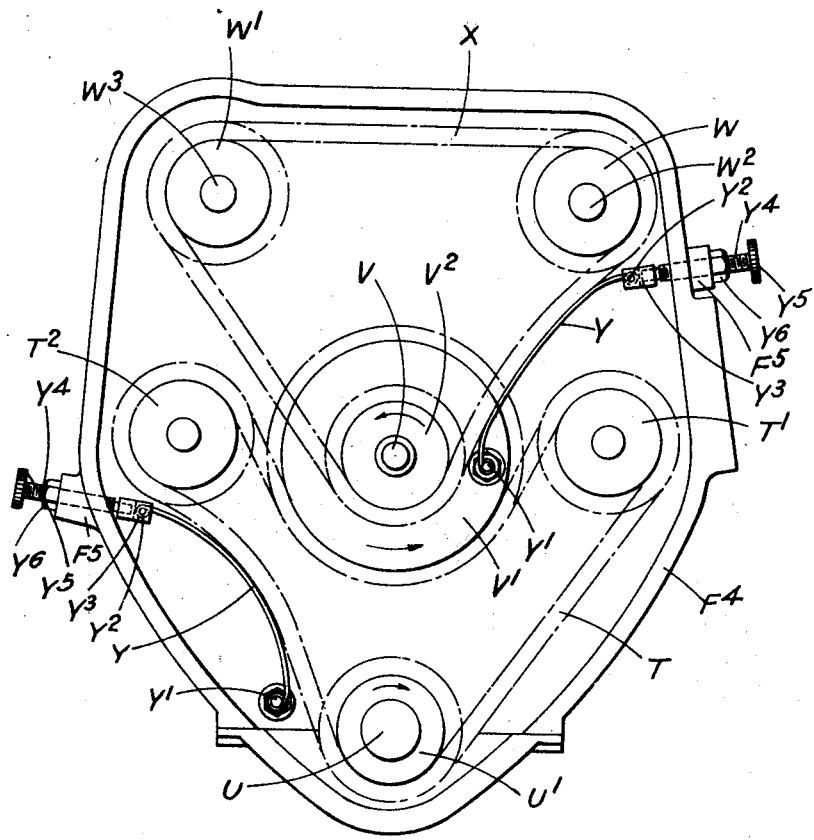

April 17, 1928.  J. WELLER  1,666,882
TENSIONING DEVICE FOR TRANSMISSION CHAINS AND THE LIKE
Filed March 28, 1927  4 Sheets-Sheet 1
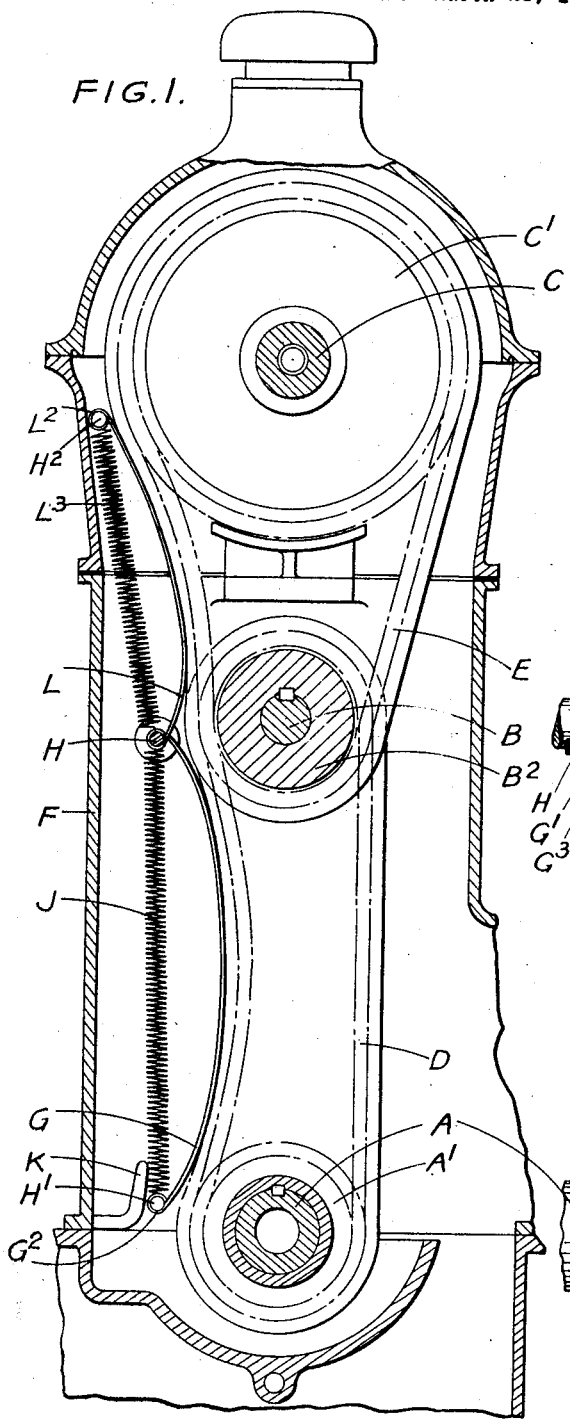
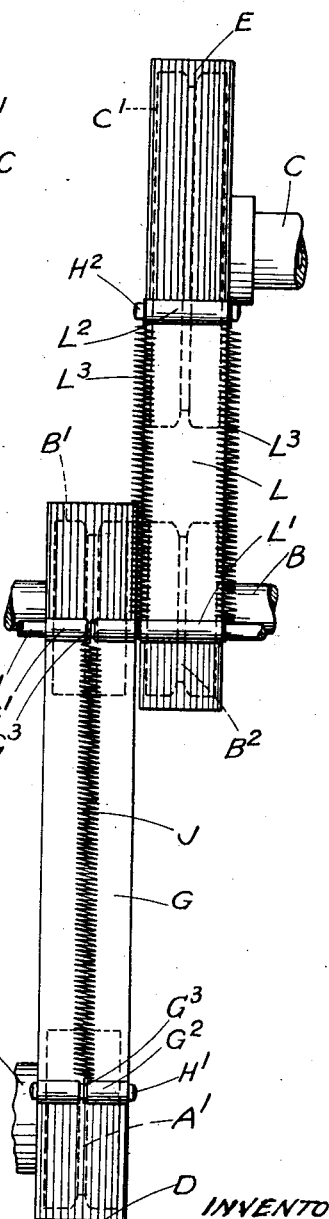
INVENTOR
J. WELLER
ATT'Y

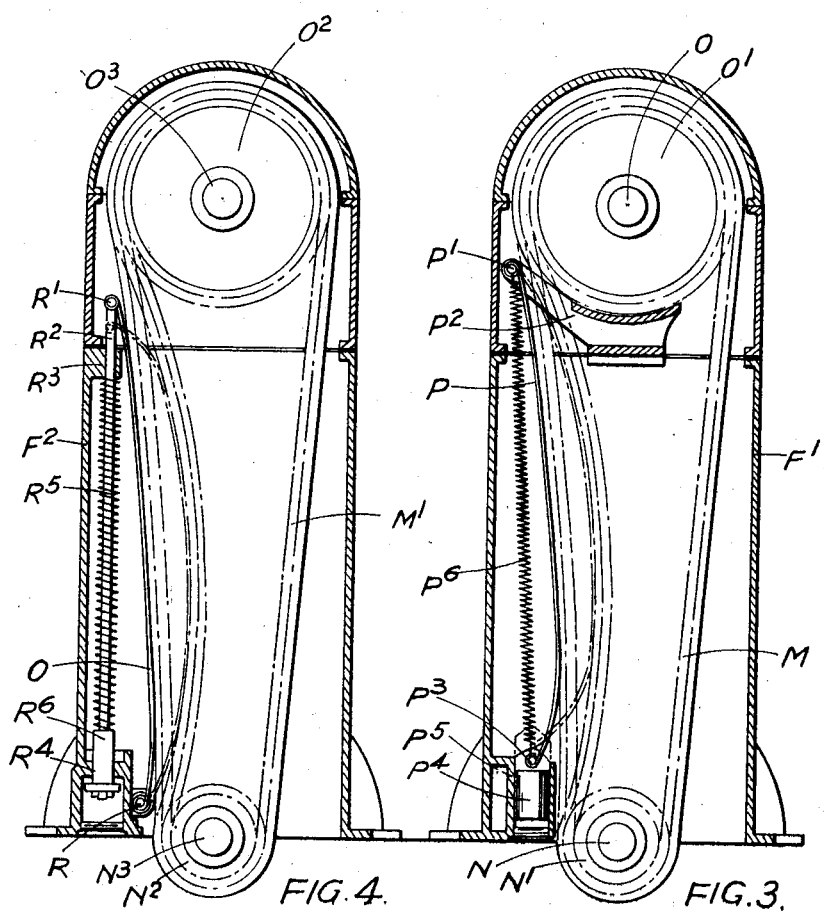

April 17, 1928.  
J. WELLER  
1,666,882  
TENSIONING DEVICE FOR TRANSMISSION CHAINS AND THE LIKE  
Filed March 28, 1927  4 Sheets-Sheet 4

INVENTOR,  
J. WELLER  
ATT'Y.

Patented Apr. 17, 1928.

1,666,882

UNITED STATES PATENT OFFICE.

JOHN WELLER, OF GREAT BOOKHAM, ENGLAND.

TENSIONING DEVICE FOR TRANSMISSION CHAINS AND THE LIKE.

Application filed March 28, 1927, Serial No. 179,079, and in Great Britain April 12, 1926.

This invention relates to tensioning devices for transmission chains and the like and has for its object to provide an improved tensioning device of the kind adapted to press against the portion of a chain or like transmission member which lies between two chain sprockets or wheels.

According to this invention a tensioning device comprises a metal or like strip or slipper adapted to bear against a portion of the flexible transmission member between the wheels over which this member passes, and means exterior to the strip for applying thereto a force tending to move the ends of the strip towards one another and thereby cause the intermediate portion of the strip to bulge and press against the flexible transmission member. In this way less pressure will tend to be exerted through the strip on the flexible transmission member when the latter is relatively tight than when it is slacker, the pressure on the flexible member then tending to be increased.

The movable end or ends of the strip are each conveniently adapted to bear against a suitable thrust or guide surface and such surface may be made in the form of a ramp surface or cam so shaped that as the end of the strip moves along it to take up the slack of the flexible transmission member, the angle of the thrust surface acts to modify the pressure exerted by the strip on the transmission member as may be required.

The mechanism for applying the force to the end or ends of the strip so as to tend to move them towards one another, may be adapted either to operate automatically so as to maintain the chain or like transmission member always free from slack or at the correct tension, or may be manually operated. When this mechanism is of the automatic type it is conveniently constituted by a spring or springs tending to move one end of the strip towards the other. Thus, one or more springs may be provided connecting the two ends of the strip so as to tend to draw them towards one another. In either case one end of the strip is preferably anchored and the other end only is movable, but if desired both ends may be movable.

When manually operated devices are provided for applying the desired force to the strip these may act on one or each end thereof and conveniently each comprises a screwthreaded or other manually operated adjusting member acting on the adjacent end of the strip and capable of causing it to move towards or away from the other end thereof. Thus the intermediate portion of the strip may be caused to bulge and thus to press against the chain or like flexible transmission member to a greater or less extent.

The invention may be carried into practice in various ways but five alternative constructions according to this invention are illustrated by way of example in the accompanying drawings, in which—

Figure 5:
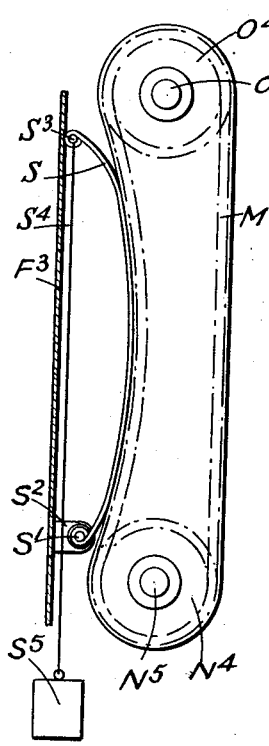
Figure 7:
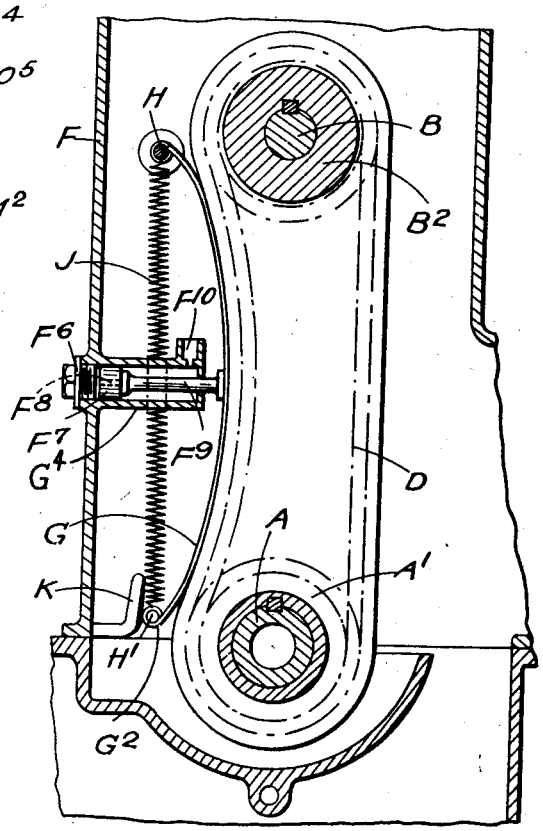

Figure 1 is a front elevation partly in section of one construction employing two chains each provided with an automatic tensioning device according to this invention, Figure 2 is a side elevation of the construction shown in Figure 1 with the casing removed for the sake of clearness, Figures 3, 4 and 5 are front elevations partly in section of three alternative constructions each having an automatic chain tensioning device according to this invention, Figure 6 is a view similar to Figures 3, 4 and 5 of another construction according to this invention in which the chain tensioning devices are adapted to be manually adjusted, and Figure 7 shows an arrangement similar to that shown in the lower portion of Figure 1 but with a dashpot device acting on the metal strip.

In the construction shown in Figures 1 and 2 the transmission mechanism comprises a driving shaft A and two driven shafts B and C. The driving shaft A carries a chain wheel $A^1$ which is operatively connected to a chain wheel $B^1$ on the driven shaft B by means of a chain D while a second chain wheel $B^2$ on the driven shaft B is in turn operatively connected to a chain wheel $C^1$ on the second driven shaft C by means of a chain E, the whole mechanism being mounted in a casing F. Each of the chains D and E is provided with a tensioning device according to this invention. The tensioning device for the chain D comprises a metal strip G preferably formed of spring steel or the like and provided with sockets $G^1$, $G^2$ at its ends through which pins or bolts H, $H^1$ are respectively passed. The sockets $G^1$, $G^2$ are each provided with a circumferential slot as shown at $G^3$, these slots enabling the ends of a tension spring J to engage the pins or bolts H, $H^1$ so as to tend to draw the ends of the strip G towards one another.

The pin or bolt H is rigidly mounted in the casing E while the pin $H^1$ is carried solely by its socket $G^2$ which is adapted to bear against and is capable of sliding along a thrust member K on the casing F. Owing to the force of the spring J tending to draw the ends of the strip G together, the intermediate portion of this strip G tends to bulge and thus engages and presses against the portion of the chain D lying between the chain wheels $B^1$ and $A^1$ so as to maintain this chain in tension. The thrust member K is preferably formed with an inclined thrust surface as shown so as to assist or modify the pressure exerted through the strip G on the chain D.

Surrounding the pin or bolt H is also a socket $L^1$ on one end of a second metal strip L the other end of which is provided with a second socket $L^2$ in which is disposed a pin $H^2$. Two tension springs $L^3$ are provided each connecting one end of the pin $H^2$ to the pin or bolt H and thus tending to draw the ends of the metal strip L towards one another. In this way the intermediate portion of the metal strip L is caused to bulge and press against the portion of the chain E lying between the chain wheels $B^2$ and $C^1$ as shown, the socket $L^2$ bearing against and being capable of sliding along a portion of the casing F.

In the construction shown in Figure 3 a chain M transmits rotary motion from a chain wheel $N^1$ mounted on a driving shaft N to a chain wheel $O^1$ mounted on a driven shaft O. A metal strip P is provided adapted to press against the portion of the chain between the two chain wheels $N^1$ and $O^1$ as shown, one end of this strip engaging a pin $P^1$ carried by a bracket $P^2$ rigidly carried by the casing $F^1$ in which the whole mechanism is mounted, while the other end of the strip P engages a pin $P^3$ carried by a guide member or piston $P^4$ adapted to slide in a guide or cylinder $P^5$ formed in the casing $F^1$ as shown. The cylinder $P^5$ conveniently contains oil and forms a dash-pot to check sudden movements of the tensioning device due to fluctuations in the load transmitted through the chain D. A tension spring $P^6$ is provided connected at its ends respectively to the pins $P^1$ and $P^3$ and thus tending to draw the ends of the metal strip P towards one another and thereby to cause the intermediate portion of the strip to press against the chain M and thus maintain it at the correct tension.

Figure 4 shows an arrangement in which a chain $M^1$ transmits rotary motion from a chain wheel $N^2$ on a driving shaft $N^3$ to a chain wheel $O^2$ on a driven shaft $O^3$. The chain tensioning device comprises a metal strip Q one end of which is secured to a fixed pin R while the other end engages a pin $R^1$ mounted on the end of a rod $R^2$ carried at its ends and movable axially in guides $R^3$, $R^4$ in the casing $F^2$ in which the mechanism is mounted, the guide $R^4$ being formed as a cylinder containing oil and acting as a dash-pot to prevent sudden movements of the tensioning device due to fluctuations in the load transmitted through the chain $M^1$. A compression spring $R^5$ surrounds the rod $R^2$ and bears at its ends respectively against the guide $R^3$ and a shoulder $R^6$ on the rod $R^2$ thus tending to move the rod axially so as to bring the ends of the metal strip R towards one another. In this way the intermediate portion of the strip is caused to bulge so as to press against the chain $M^1$ as shown.

In the arrangement shown in Figure 5 a chain $M^2$ transmitting motion from a chain wheel $N^4$ on a driving shaft $N^5$ to a chain wheel $O^4$ on a driven shaft $O^5$ is adapted to be maintained in tension by a tensioning device comprising a metal strip S one end of which engages a pin $S^1$ rigidly mounted on a bracket $S^2$ on the casing $F^3$. The other end of the strip S engages and is adapted to slide along a portion of the casing $F^3$ and carries a pin $S^3$ to which is attached one end of a wire, link or the like $S^4$ to the other end of which a weight $S^5$ is secured. In this way the weight $S^5$ exerts a pull on the end of the metal strip S to which it is attached and tends to move it towards the other end thereof, whereby the intermediate portion of this strip is caused to bulge and press against the chain $M^2$.

In each of the arrangements described above it will be seen that, when the chain is tight, the metal tensioning strip will be relatively straight so that the effective force of the spring, weight or the like causing the strip to bulge and thus to press against the chain will be relatively small. When the chain becomes slack, however, so that the strip bulges to a greater extent, the effective force of the spring, weight or the like to cause the strip to press against the chain is correspondingly greater. In this way the pressure exerted by the strip against the chain is relatively small when the chain is tight but automatically increases as the chain gets slacker thus always maintaining the chain at substantially the correct tension.

Figure 6 shows an arrangement wherein a chain T transmits motion from a chain wheel $U^1$ on a driving shaft U to a chain wheel $V^1$ on a driven shaft V, the chain passing also round two auxiliary wheels $T^1$, $T^2$ as shown. Also mounted on the shaft V is a second chain wheel $V^2$ from which motion is transmitted to two chain wheels W, $W^1$ on two further driven shafts $W^2$, $W^3$ by a chain X. A manually controlled tensioning device is provided for each of the chains T and X comprising a metal strip Y one end of which engages with a pivot pin $Y^1$ rigidly mounted in the casing $F^4$ in which the mechanism is mounted while its other end engages a pivot pin $Y^2$ carried by a member $Y^3$. The member $Y^3$ is mounted on the end of a screwthreaded adjusting member $Y^4$ so that this member can rotate relatively to the member $Y^3$, the adjusting member $Y^4$ engaging a suitably screwthreaded socket $F^5$ in the casing $F^4$, and being provided with a milled head $Y^5$ and a lock nut $Y^6$.

It will be seen that with the arrangement illustrated in Figure 6 by rotating the adjusting members $Y^4$ the metal strips Y can be caused to press to a greater or less extent against the chains T and X and, moreover, that, while only a relatively light pressure can be exerted on the chains when they are tight owing to the metal strips then being substantially straight, when the chains become slack so that the strips can bulge to a greater extent, the adjusting devices are capable of causing the metal strips to exert a correspondingly greater pressure on the chains. Thus, for a given force applied to either of the adjusting members $Y^4$, a greater force will be exerted on the chain by the metal strip Y when the chain is slack than when it is tight.

The construction shown in Figure 7 is similar to that shown in the lower portion of Figure 1 except that a dashpot device is provided comprising a cylinder $G^4$ formed integral with the casing F and closed at its outer end by a cap $F^6$. Mounted within the cylinder $G^4$ is a piston $F^7$ provided with a small slot or leak $F^8$ and connected to the metal strip G by means of a piston rod $F^9$. The cylinder $G^4$ is adapted to be filled with oil and this is conveniently effected by providing a cup $F^{10}$ which catches oil carried upwards by the chain D. It will be seen that this dashpot device tends to prevent sudden movements of the metal strip G.

It is to be understood that the means whereby the desired force is applied to the end or ends of the metal strip and other details of construction may be varied within wide limits, without departing from this invention.

What I claim as my invention and desire to secure by Letters Patent is:—

1. In a tensioning device for flexible transmission members, the combination of a flexible transmission member, two wheels over which this member passes, a flexible metal strip adapted to bear against a portion of the flexible transmission member between the wheels, and means exterior to the strip for applying thereto a force tending to move its ends towards one another and thereby cause the intermediate portion of the strip to bulge and press against the flexible transmission member as set forth.

2. In a tensioning device for flexible transmission members, the combination of a flexible transmission member, two wheels over which this member passes, a flexible metal strip adapted to bear against a portion of the flexible transmission member between the wheels, and a spring connecting the ends of the metal strip and tending to draw them towards one another and thereby cause the intermediate portion of the metal strip to bear against the flexible transmission member as set forth.

3. In a tensioning device for flexible transmission members the combination of a flexible transmission member, two wheels over which this member passes, a flexible metal strip adapted to bear against a portion of the flexible transmission member between the wheels, means for anchoring one end of the metal strip, and means exterior to the strip for applying to the other end thereof a force tending to move it towards the anchored end and thereby cause the intermediate portion of the strip to bulge and press against the flexible transmission member as set forth.

4. In a tensioning device for flexible transmission members, the combination of a flexible transmission member, two wheels over which this member passes, a flexible metal strip adapted to bear against a portion of the flexible transmission member between the wheels, means for anchoring one end of the metal strip, a spring, and an operative connection between the spring and the free end of the metal strip whereby the spring tends to move the free end of the strip towards the anchored end thereof and thus cause the intermediate portion of the strip to bulge and press against the flexible transmission member as set forth.

5. In a tensioning device for flexible transmission members, the combination of a flexible transmission member, two wheels over which this member passes, a flexible metal strip adapted to bear against a portion of the flexible transmission member between the wheels, means for anchoring one end of the metal strip, and a spring connecting the free end of the metal strip to the anchored end and tending to draw these ends towards one another and thereby cause the intermediate portion of the strip to bulge and press against the flexible transmission member as set forth.

6. In a tensioning device for flexible transmission members, the combination of a flexible transmission member, two wheels over which this member passes, a flexible metal strip adapted to bear against a portion of the flexible transmission member between the wheels, means for anchoring one end of the metal strip, a spring, an operative connection between the spring and the free end of the metal strip whereby the spring tends to move it towards the anchored end thereof and thereby cause the intermediate portion of the strip to bulge and press against the flexible transmission member, and a dashpot device controlling the movements of the metal strip whereby sudden movements thereof are prevented.

7. In a tensioning device for flexible transmission members, the combination of a flexible transmission member, two wheels over which this member passes, a flexible metal strip adapted to bear against a portion of the flexible transmission member between the wheels, means for anchoring one end of the metal strip, a spring connecting the free end of the metal strip to the anchored end thereof and tending to draw these ends towards one another and thereby cause the intermediate portion of the strip to bulge and press against the flexible transmission member, and a dashpot device controlling the movements of the metal strip whereby sudden movements thereof are prevented.

8. In a tensioning device for flexible transmission members, the combination of a flexible transmission member, two wheels over which this member passes, a flexible metal strip adapted to bear against a portion of the flexible transmission member between the wheels, and a spring acting on at least one end of the metal strip and tending to move it towards the other end thereof and thereby cause the intermediate portion of the strip to bulge and press against the flexible transmission member.

9. In a tensioning device for flexible transmission members, the combination of a flexible transmission member, two wheels over which this member passes, a flexible metal strip adapted to bear against a portion of the flexible transmission member between the wheels, a spring acting on at least one end of the metal strip and tending to move it towards the other end thereof and thereby cause the intermediate portion of the strip to bulge and press against the flexible transmission member, and a dashpot device controlling the movements of the metal strip whereby sudden movements thereof are prevented.

10. In a tensioning device for flexible transmission members, the combination of a flexible transmission member, two wheels over which this member passes, a flexible metal strip adapted to bear against a portion of the flexible transmission member between the wheels, and a spring connecting one end of the metal strip to a fixed point and tending to draw the two ends of the strip towards one another and thereby cause the intermediate portion of the metal strip to bear against the flexible transmission member as set forth.

11. In a tensioning device for flexible transmission members, the combination of a flexible transmission member, two wheels over which this member passes, a flexible metal strip adapted to bear against a portion of the flexible transmission member between the wheels, an anchorage for one end of the metal strip, and a spring connecting the free end of the strip to the anchorage and tending to draw the two ends of the strip towards one another and thereby cause the intermediate portion of the metal strip to bulge and press against the flexible transmission member as set forth.

12. In a tensioning device for flexible transmission members, the combination of a flexible transmission member, two wheels over which this member passes, a flexible metal strip adapted to bear against a portion of the flexible transmission member between the wheels, and means acting on the ends of the strip so as to cause it to assume a curved form and bear against the flexible transmission member.

13. In a tensioning device for flexible transmission members, the combination of a flexible transmission member, two wheels over which this member passes, a flexible metal strip adapted to bear against a portion of the flexible transmission member between the wheels, and resilient means acting on the ends of the strip so as to cause it to assume a curved form and bear against the flexible transmission member.

In testimony whereof I have signed my name to this specification.

JOHN WELLER.